3,418,265
PROCESS OF PREPARING LATICES OF SUB-
MICRON SIZE PARTICLES OF ETHYLENE
POLYMERS
Dorothee M. McClain, Cincinnati, Ohio, assignor to National Distillers and Chemical Corporation, New York, N.Y., a corporation of Virginia
No Drawing. Continuation-in-part of application Ser. No. 370,006, May 25, 1964. This application Dec. 20, 1966, Ser. No. 603,118
13 Claims. (Cl. 260—29.6)

ABSTRACT OF THE DISCLOSURE

Aqueous stable film-forming ethylene polymer latices containing ethylene polymer particles of submicron size are provided. The film forming latices are made up of water, ethylene polymer homogeneously dispersed therein with an emulsifier therefor in an amount within the range from about 0.5 to about 25 parts per 100 parts of polymer, and a volatile inert organic liquid that is soluble in the ethylene polymer in an amount within the range from about 10 to about 100 parts per 100 parts of polymer, sufficient to soften the polymer particles and render them film-forming upon deposition from the latex.

A process for producing the submicron high molecular weight stable film-forming aqueous ethylene polymer latices is also provided.

---

This application is a continuation-in-part of U.S. application Ser. No. 160,733, filed Dec. 6, 1961 and now abandoned, and of U.S. application Ser. No. 370,006, filed May 25, 1964.

This invention relates to submicron high molecular weight aqueous ethylene polymer latices and to a process of producing the same, and more particularly to submicron particle size ethylene polymer latices produced by softening the polymer during emulsification thereof in water with a water-insoluble organic liquid that is volatile at ordinary atmospheric temperatures, and is soluble in the ethylene polymer. These latices produce air-drying films at atmospheric temperatures, and have rather high solids contents, ranging from about 30 to about 45% solids.

Polyethylene powder having a particle size ranging from about 1 to about 100 microns has been prepared in accordance with the procedure described in U.S. applications Ser. Nos. 160,733 and 370,006. Such ultra-fine polyethylene powder can be emulsified in water by combining the same with water and an emulsifying agent, such as a "Pluronic" emulsifier of the polyoxyalkylene type described hereinafter.

Latices are now widely used in the formation of coatings. In order to be useful for this purpose, however, it is necessary that the latex be film-forming, that is, when it dries it should be capable of depositing the suspended particles in the form of a continuous film.

A polymer dispersion is composed of a separate polymer phase in the form of individual particles in a liquid medium. The specific term "latex" describes a dispersion in which these particles are spheres of small size, sufficiently soft to form a continuous coating on a substrate after evaporation of the dispersion medium, without going through a melting stage. Dispersions which contain hard polymers of the same particle size as those of soft polymers will upon deposition of the thin layer dry to individual particles, either not bonded to each other at all, or only loosely bonded to each other. The difference between two such coatings can be readily seen after evaporation of the medium. A film-forming latex will dry to a clear or opaque coating, whereas a non-film forming latex will give a white non-clear discontinuous coating. The latter form of coating will form a continuous film only after further heating at or above the softening point of the particles, at which temperature it is possible to fuse the particles to form a film.

Polyethylene latices having very small particle size polyethylene dispersed therein have been prepared heretofore by stirring a dilute solution containing from about 1 to about 10% of polyethylene in an organic solvent into water in the presence of an emulsifier. The resultant latex has a rather low solids content, appreciably less than 30% by weight, and water and solvent both must be removed therefrom in order to obtain a useful emulsion.

Emulsions of low molecular weight oxidized polyethylene waxes, such as the emulsified Epolenes and AC waxes, also are known. These emulsions contain very small particle size polyethylene, but produce brittle inferior films. Emulsions also can be obtained by emulsion polymerization of ethylene, but such emulsions also produce brittle films, even after baking.

Zdanowski and Brown, Film-Forming Characteristics of Emulsion Polymers, presented at the May 1958 meeting of the Chemical Specialties Manufacturers' Association, have pointed out that the coalescence of a latex to form a continuous film is the result of several factors, such as the action of a force, the capillary pressure between particles upon those particles, the deformation of the particles to fill out the spaces left by the evaporating water, and their fusion to a continuous film. If the capillary pressure (which is inversely proportional to the particle size) exceeds the resistance to deformation of the polymer particle, coalescence will occur. Thus, coalescence or film formation is not only related to particle size, but also to the deformability of the polymer. Emulsions which produce inferior films do so either because the polymer has an excessive resistance to deformation, or because the particle size is excessive, or because the polymer itself has undesirable physical characteristics, due to the method of its preparation or to other factors.

In accordance with the instant invention, the deformability of ethylene polymers is improved so as to enhance the formation of continuous films, and the particle size of the ethylene polymer in aqueous emulsion form is considerably reduced, by incorporating a relatively small amount of an organic liquid therewith in the course of the emulsification of the polymer in water. The organic liquid that is employed is inert to the ethylene polymer, is soluble in the ethylene polymer, and is volatile at normal atmospheric temperatures. In consequence, in the course of the emulsification of the polymer, the organic liquid dissolves in the polyethylene, reducing its melt viscosity, and thus favoring the formation of finer particles, and also serves as a temporary plasticizer which facilitates the deformation of the particles during film formation. Inasmuch as the organic liquid is volatile, it does not remain permanently with the polymer, but after formation of the film, evaporates therefrom, producing a film which possesses all of the desirable properties of the base ethylene polymer.

The aqueous ethylene polymer latices of the invention consist essentially of an ethylene polymer, water, a water-soluble emulsifier for the polymer, and an inert organic liquid as defined above. The emulsifier is of the nonionic polyoxyalkylene oxide type, and is based on polyoxyalkylene chains, which include hydrophilic groups, in the form of a polyoxyalkylene chain.

The invention is applicable to any ethylene polymer. Polyethylene homopolymer is a preferred embodiment of the polymer in accordance with the invention. The invention can also be applied to mixtures of polymers, including polyethylene in a major proportion, and to copolymers of ethylene with other copolymerizable monomers in which the ethylene is present, in an amount of at least 25%, and the other copolymerizable monomer is present in an amount of up to about 75%, such as, for example, copolymers of ethylene with other copolymerizable olefins, such as propylene, butylene, pentylene and hexylene, copolymers of ethylene and acrylonitrile, copolymers of ethylene and vinyl chloride, copolymers of ethylene and vinyl acetate, copolymers of ethylene and styrene, and copolymers of ethylene and vinyl toluene. It will accordingly be understood that the term "ethylene polymer" as used in the specification and claims is intended to refer to any of the ethylene homopolymers and copolymers.

The ethylene polymer latices in accordance with the invention are prepared as an aqueous system with the aid of an emulsifying agent for the ethylene polymer. In accordance with the present invention such emulsifying agents constitute nonionic polyoxyalkylene emulsifiers of the types described hereinafter.

The amount of emulsifier will be determined by the amount required to form a homogeneous aqueous dispersion of the ethylene polymer and of the organic liquid. Very small amounts will give dispersions of excellent stability. Amounts as low as 0.5 part per 100 parts of polymer have been used with many ethylene polymers. Very stable dispersions are obtainable at amounts within the range from about 2 to about 25 parts per 100 parts of polymer, and such amounts accordingly are preferred.

There is no upper limit on the amount of emulsifying agent, except that at amounts beyond that necessary to form a stable dispersion, the emulsifier may be wastefully used. Usually, the amount will not exceed about 25 parts per 100 parts of polymer.

One group of nonionic emulsifiers that can be employed has a water-insoluble polyoxyalkylene glycol (other than ethylene glycol) nucleus with a molecular weight of more than 900 which has been extended with water-soluble polyoxyethylene groups at each end. The water-soluble portion of the molecule should constitute at least 50% by weight of the total. The polyoxyalkylene glycol can be aliphatic, aromatic or alicyclic in nature, can be saturated or unsaturated, and can be represented by the formula:

$$HO(C_2H_4O)_y(C_mH_nO)_x(C_2H_4O)_yH$$

wherein $x$, $y$, $m$ and $n$ are integers. When $(C_mH_nO)_x$ is saturated aliphatic, $n=2m$.

Compounds in this class are described in U.S. Patents Nos. 2,674,619 to Lundsted, dated Apr. 6, 1954 and 2,677,700 to Jackson et al., dated May 4, 1954.

The polyoxyalkylene compounds of No. 2,674,619 are defined by the formula:

$$Y[(C_3H_6O)_n\text{—E—H}]_x$$

where

Y is the residue of an organic compound containing therein $x$ active hydrogen atoms,
$n$ is an integer,
$x$ is an integer greater than 1.

The values of $n$ and $x$ are such that the molecular weight of the compound, exclusive of E, is at least 900, as determined by hydroxyl number; E is a polyoxyalkylene chain wherein the oxygen/carbon atom ratio is at least 0.5, and E constitutes at least 50% by weight of the compound.

The polyoxyalkylene compounds of No. 2,677,700 are defined by the formula:

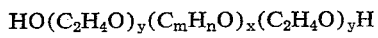

wherein: Y is the residue of an organic compound containing therein a single hydrogen atom capable of reacting with a 1,2-alkylene oxide; $R_1$, $R_2$, $R_3$ and $R_4$ are selected from the group consisting of H, aliphatic radicals and aromatic radicals, at least one such substituent being a radical other than hydrogen; $n$ is greater than 6.4 as determined by hydroxyl number and X is a water-solubilizing group which is nonionic and constitutes at least 50% by weight of the total compound.

The compounds of Patent No. 2,674,619 are sold commercially by the Wyandotte Chemicals Corporation under the trademark "Pluronic." The following are examples of compounds corresponding to the above formula:

| Name | Molecular weight polyoxypropylene base | Ethylene oxide content in final product, weight percent | Molecular weight of final product |
|---|---|---|---|
| Pluronic F68 | 1,700 | 80 | 8,750 |
| Pluronic P75 | 2,050 | 50 | 4,100 |
| Pluronic F-98 | 2,700 | 80 | 13,500 |
| Pluronic F-108 | ¹ 3,400 | 80 | 12,000–22,000 |

¹ Approximately.

Another group of emulsifiers that can be employed has a water-insoluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight percent of the hydrophilic portion of the molecule should be at least 50. This type of emulsifier is available commercially under the trademark "Tetronic." These ethylene oxide adducts of an aliphatic diamine such as ethylene diamine extended with propylene oxide have the following formula:

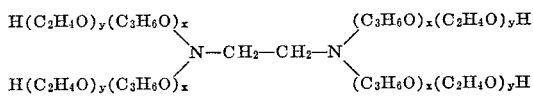

Compounds in this class are described in U.S. Patents No. 2,674,619 and No. 3,250,719 and are sold commercially by the Wyandotte Chemicals Corporation under the trademark "Tetronic." The following are examples of compounds corresponding to the above formula:

| Name | Molecular weight for ethylene diamine-propylene oxide base | Ethylene oxide content in final product, weight percent | Molecular weight of final product |
|---|---|---|---|
| Tetronic 707 | 3,000 | 75 | 12,000 |
| Tetronic 908 | 4,050 | 85 | 27,000 |

Other compounds in this class include ethylene oxide adducts of polyhydroxy alcohols extended with alkylene oxide, ethylene oxide adducts of polyoxyalkylene esters of polybasic acids, ethylene oxide adducts of polyoxyalkylene extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50% by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Such compounds can be of the following formulae ($m$, $n$, $x$ and $y$ are as above):

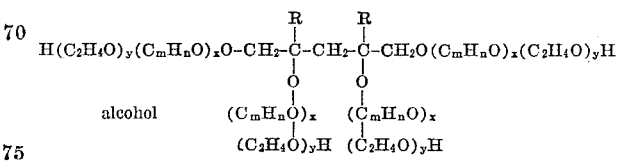

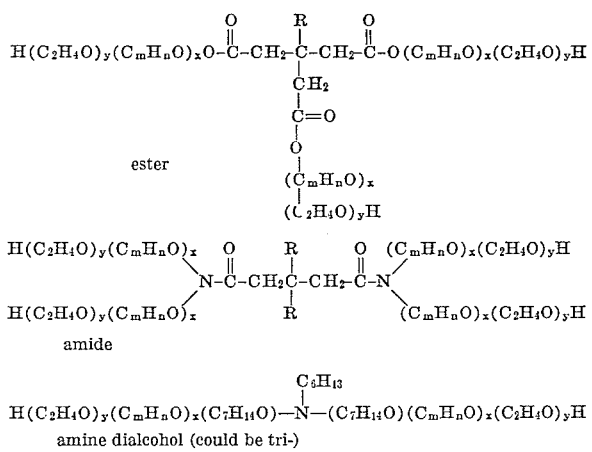

ester amide amine dialcohol (could be tri-)

A third group of nonionic emulsifiers that can be employed includes high molecular weight polyoxyethylene adducts of hydrophobic organic compounds having one active hydrogen, such as aliphatic, saturated or unsaturated alcohols having at least eighteen carbon atoms; mono- or di-substituted alkyl, alkenyl or alkynyl aromatic or alicyclic alcohols of at least fifteen carbon atoms; monobasic aliphatic, saturated or unsaturated aromatic or alicyclic monobasic hydroxy acid derivatives such as N-alkyl, -alkenyl or -alkynyl amides or alkyl, alkenyl or alkynyl esters of at least eighteen carbon atoms; alkyl, alkenyl or alkynyl glycol monobasic acid esters of at least eighteen carbon atoms; or di-N-alkyl, -alkenyl or -alkynyl (aromatic or alicyclic) aminoalkanols having at least eighteen carbon atoms. The hydrophilic portion of these molecules should be at least 50% by weight of the total. Such compounds can have the following formulae ($m$, $n$, $x$, and $y$ are as above):

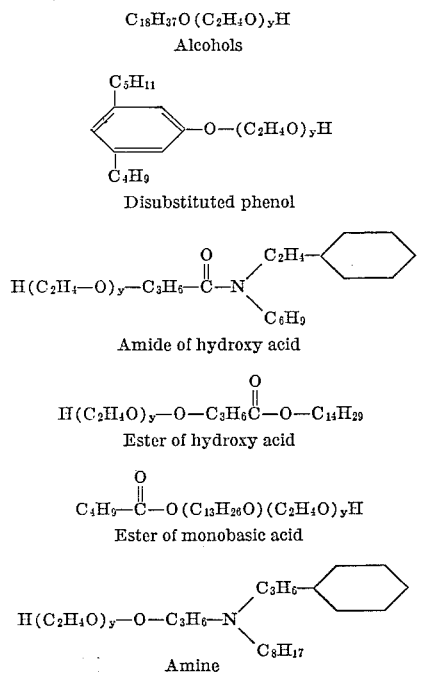

The preferred emulsifiers are the Pluronics. These are nonionic block polymers and copolymers of ethylene oxide and propylene oxide, as well as other alkylene oxides.

The organic liquids that are employed in accordance with the invention are water-insoluble. They are also volatile at the temperature at which the latex is dried to form a film, atmospheric temperature, or oven temperature.

The liquids can be immiscible with the emulsifier that is used, but they can also be miscible therewith, as desired. If the organic liquid is immiscible with the emulsifier, a straight-line relationship is observed between melt viscosity and particle size of the polymer in the emulsion. Organic liquids falling within this class include the dialkyl ethers, alicyclic hydrocarbons, and branched chain hydrocarbons. The saturated aliphatic straight chain hydrocarbons also show a relationship between melt viscosity and particle size, but this relationship is not necessarily a straight-line relationship.

Water-insoluble organic liquids which are solubilizers for the emulsifier and which also show good compatibility with the ethylene polymer do not as a group show a good correlation of melt viscosty and particle size, probably due to the superimposed effect of the solubility of the liquid in the emulsifier. The organic ketones, aromatic ethers, chlorinated hydrocarbons, aromatic hydrocarbons and naphthenic hydrcarbons fall into this category. The distribution coefficient of such organic liquids between the ethylene polymer and emulsifier phases plays an important role in this correlation. When the distribution coefficient of the liquid favors the ethylene polymer, as in the case of xylene, ethyl benzene, cumene, methylcyclohexene and tetralin, the expected straight-line relationship holds, except that a greater extent of particle size reduction is realized for the same lowering of melt viscosity. When, however, the distribution coefficient favors the emulsifier over the ethylene polymer, as in the case of phenyl ether, dibutyl ketone, dibutyl Carbitol and phenetole, anomalous results are obtained. Such organic liquids can be used in accordance with the invention, but the results and their effectiveness are less predictable, and the amounts that are to be employed will be determined by trial and error in each case.

Exemplary liquids which are immiscible with Pluronic emulsifiers include decalin, ethyl cyclohexane, octane, decane, dodecane, and tetradecane. Exemplary liquids in the second category are xylene, ethyl benzene, cumene, methylcyclohexene, tetralin, toluene, mesitylene, dibutyl Carbitol, dibutyl ketone, phenyl ether, and cyclohexanone.

Very small amounts of these liquids are effective. As little as 10 parts per 100 of the ethylene polymer will give a considerable improvement in small particle size, and a lowering in melt viscosity. There is no critical upper limit on the amount of the liquid, except that an amount which gives an excessive reduction in melt viscosity is not required. However, no permanently disadvantageous results will be obtained in the final film that is obtained as the product, inasmuch as the liquid is volatile, and will in due time be volatilized from the film, leaving the base resin and any other nonvolatile components. There is normally, however, no necessity to employ an amount in excess of about 100 parts per 100 of polymer. Excellent results are obtained when the amount employed is within the range from about 20 to about 50 parts per 100 of polymer, and such amounts accordingly are preferred.

The latices in accordance with the invention are readily prepared by hot melt emulsification techniques using conventional dispersion or latex-forming mixing equipment, which can be operated under superatmospheric pressure, if necessary. The ethylene polymer, water, emulsifier and organic liquid employed are brought to a temperature at which the ethylene polymer is softened or molten, and under a pressure sufficient to maintain the volatile organic liquid and the water in the liquid phase, and thoroughly mixed until the mixture is homogeneous. Usually, a temperature of from 60 to 250° C. is satisfactory. Thereafter, the homogeneous mix is rapidly cooled to below the softening temperature of the polymer, with continued stirring, whereupon a stable latex is formed. The latex can be filtered, if desired, to remove any particles that for some reason have not become emulsified or are excessively large.

The latices of the invention are highly film-forming, and will form continuous smooth films upon a smooth base when applied thereto by any technique and allowed to dry at atmospheric temperature and pressure. The drying can be expedited by heating the film at an elevated temperature, such as in an oven, but this is not essential.

In the working examples, the latices were formed by placing the ethylene polymer, water, emulsifier and organic liquid in a reactor cold. The reactor was sealed, and heated to 200° C., at which time heating was discontinued, and stirring at the rate of 8,000 to 10,000 r.p.m. applied for seven minutes. Rapid cooling then was applied, using Dry Ice, while slow stirring was continued until the temperature fell to 150° C. At atmospheric pressure the vessel was opened, and the latex discharged. Immediately after cooling of the latex to room temperature, it was strained through a paint filter, and analyzed for particle size. Film formation was evaluated by casting 8 ml. thick films on glass plates, and drying them either at room temperature, or at ambient temperature, in an oven.

Melt viscosities of the polyethylene were measured in Aerosol glass pressure tubes (Fisher-Porter, equipped with stainless steel couplings), using the falling ball method. The valve in the coupling was replaced with an iron plug which facilitated the holding of a 3/32 inch diameter steel ball below the plug by an outside magnet. Fifty parts per hundred of liquid were mixed into the polyethylene in powdered form, and charged to the tubes, which were heated to 200° C. in a constant temperature bath. After the tubes had reached 200° C., the magnet was removed, and the time for a 5 inch fall of the steel ball was measured. Duplicate checks were carried out in all determinations. Viscosity was calculated by Stokes' law.

Visual observations of the behavior of Pluronic, water and organic liquid were carried out in the same Aerosol tube. The components were charged cold to the tubes, the tubes sealed, and gradually heated to 200° C. Visual checks with temperature recordings were made periodically.

Particle sizes was estimated on log probability paper by the method recommended by the Coulter Electronics Industrial Division, and is expressed by stating the diameter of the upper and lower weight percent quartile, together with the median. The particle size distribution (weight percent versus particle diameter) was plotted on three cycle semi-log paper, and the area below the curve measured. This value served as a convenient measure of relative particle size.

The following examples in the opinion of the inventor represent preferred embodiments of this invention.

Example 1

The melt viscosity of polyethylene homopolymer (Petrothene 202) at 200° C. containing 50 parts per 100 of the organic liquids listed in Table I was determined in accordance with the established procedure. The following data were obtained:

Table I.—Melt viscosity of Petrothene 202 at 200° C. containing 50 p.p.h. of various additives

| Organic liquid | Viscosity (poises) |
|---|---|
| No liquid | |
| Octane | 78 |
| Decane | 91 |
| $C_{12}$–$C_{14}$ n-paraffin | 128 |
| Butyl ether | 128 |
| Dibutyl ketone | 152 |
| Xylene | 159 |
| Mesitylene | 165 |
| Ethyl benzene | 168 |
| Hexyl ether | 174 |
| Methyl cyclohexene | 195 |
| Dibutyl carbitol | 195 |
| Phenetole | 200 |
| Cumene | 200 |
| Mineral spirits [1] | 202 |
| Decalin | 243 |
| Tetralin | 258 |
| Phenyl ether | 280 |

[1] Aliphatic petroleum naphtha boiling range 178 to 203° C.

It is evident from the above data that these organic liquids have a significant effect on melt viscosity, reducing it considerably in each case.

A series of aqueous polyethylene latices were prepared, using Petrothene 202 and the mineral spirits set out in the above table.

The latex formulation was as follows:

| | Parts |
|---|---|
| Polyethylene plus organic liquid | 300–350 |
| Pluronic | 27 |
| Water | 273 |
| Organic liquid (mineral spirits) | ([1]) |

[1] The amount given in Table II.

The yield percent of latex, the maximum particle size in microns at stated weight percentages, and the weight percent in submicron sizes are given in the table. The latices thus prepared were then coated on a glass plate, using the standardized test procedure, and the observation made whether a film was obtained. The following data was taken:

TABLE II

| Amount (p.p.h.) | Yield (percent) | Maximum Particle Size in Microns at Stated Weight Percentages | | | | Weight Percent in Submicron Sizes | Air-drying at R.T. |
|---|---|---|---|---|---|---|---|
| | | 25% | 50% | 75% | 100% | | |
| | 95+ | 5.40 | 8.80 | 14.00 | 131.00 | 0 | No. |
| 20 | 95 | 2.90 | 4.40 | 6.70 | 35.70 | 1 | Not quite. |
| 50 | 95 | 1.00 | 1.50 | 2.20 | 19.00 | 25 | Yes. |
| 75 | 95 | 0.79 | 1.27 | 2.00 | 21.40 | 36 | Yes. |
| 100 | | No dispersion | | | | | |

It is evident from the data that at 20 parts per 100 of polymer, the effect of the mineral spirits is just being observed. Excellent results are obtained at 50 and 75 parts per 100 of polymer, with 25 and 36% of the particles present in submicron sizes in these dispersions.

Example 2

A series of polyethylene latices was made up, using the polyethylene homopolymer and latex formulation of Example 1, with xylene as the organic liquid. The proportions of xylene were varied from 20 to 75 parts per 100 of polymer. The results are shown in Table III.

TABLE III

| Amount (p.p.h.) | Yield (percent) | Maximum Particle Size in Microns at Stated Weight Percentages | | | | Weight Percent in Submicron Sizes | Air-drying at R.T. |
|---|---|---|---|---|---|---|---|
| | | 25% | 50% | 75% | 100% | | |
| ---------- | 95 +  | 5.40 | 8.80 | 14.00 | 131.00 | 0 | No. |
| 20 | 91.7 | 2.86 | 6.72 | 9.99 | 44.70 | 7.5 | No. |
| 50 | 90.0 | <0.10 | <0.10 | 0.18 | 27.00 | 96.0 | Yes. |
| 75 | 87.0 | 0.10 | 0.18 | 0.40 | 27.80 | 92.0 | Yes. |
| [1] 75 | 92.5 | 0.10 | <0.10 | 0.16 | 27.00 | 96.5 | Yes. |

[1] 54 parts Pluronic F-108 used in dispersion.

It is evident from the data that excellent results are obtained at amounts within the range from 50 to 75 parts xylene per 100 of polymer. At 20 parts per 100, the effect of the xylene is just being observed, and the emulsion is not yet film-forming at room temperature.

Examples 4 to 11

A series of polyethylenes latices of the formulation of Example 1 was made up, using a variety of organic liquids, all at 50 parts organic liquid per 100 by weight of the polyethylene, using the procedure described previously. The following results were obtained:

TABLE IV

| Example No. | Organic Liquid | Yield (Percent) | Maximum Particle Size in Microns at Stated Weight Percentages | | | | Weight Percent in Submicron Sizes | Air-drying at R.T. |
|---|---|---|---|---|---|---|---|---|
| | | | 25% | 50% | 75% | 100% | | |
| 4 | Butyl ether | 96 | 0.17 | 0.41 | 0.73 | 22.10 | 85.0 | Yes |
| 5 | Hexyl ether | 95 | 0.60 | 1.12 | 2.00 | 27.80 | 45.0 | Yes |
| 6 | Ethyl cyclohexane | 95 | 0.29 | 0.44 | 0.67 | 27.00 | 87.0 | Yes |
| 7 | Mineral Spirits | 95 | 1.00 | 1.50 | 2.20 | 19.00 | 25.0 | Yes |
| 8 | Decalin | 97 | 1.23 | 1.92 | 3.02 | 22.10 | 15.9 | Yes |
| 9 | Octane | 96 | 0.17 | 0.30 | 0.54 | 22.10 | 93.0 | Yes |
| 10 | Decane | 94 | 0.98 | 1.81 | 3.67 | 24.00 | 22.1 | Yes |
| 11 | $C_{12}$-$C_{14}$ n-paraffin | 95 | 0.77 | 1.47 | 2.50 | 27.00 | 30.6 | Yes |

It is evident that in each of these cases, latices were obtained having a substantial proportion of the particles present in submicron sizes. All of these latices formed films at room temperature.

Examples 12 to 23

A series of polyethylene latices was made up using the polyethylene and latex formulation of Example 1, and the organic liquid shown in Table V.

TABLE IV

| Example No. | Organic Liquid | Yield (Percent) | Maximum Particle Size in Microns at Stated Weight Percentages | | | | Weight Percent in Submicron Sizes | Air-drying at R.T. |
|---|---|---|---|---|---|---|---|---|
| | | | 25% | 50% | 75% | 100% | | |
| 12 | ---------- | 95.0+ | 5.40 | 8.80 | 14.00 | 131.00 | 0 | No |
| | Benzene | 77.0 | 3.10 | 6.20 | 13.30 | 27.80 | 2.00 | No |
| 13 | Toluene | 83.0 | 0.67 | 1.28 | 2.48 | 27.80 | 36.00 | Not quite |
| 14 | Xylene | 90.0 | <0.10 | <0.10 | 0.18 | 27.00 | 96.00 | Yes |
| 15 | Mesitylene | 93.5 | 0.78 | 1.20 | 1.84 | 27.00 | 42.34 | Not quite |
| 16 | Ethyl benzene | 89.5 | <0.10 | <0.10 | 0.18 | 22.10 | 97.50 | Yes |
| 17 | Cumene | 92.5 | 0.16 | 0.28 | 0.51 | 24.00 | 92.00 | Yes |
| 18 | Methyl cyclohexane | 94.0 | 0.10 | 0.19 | 0.39 | 24.00 | 94.00 | Yes |
| 19 | Tetralin | 95+ | 0.61 | 0.93 | 1.42 | 27.00 | 54.00 | Yes |
| 20 | Phenyl ether | 84.5 | 1.52 | 4.70 | 9.62 | 27.80 | 15.80 | No |
| 21 | Phenetole | 83.5 | 3.64 | 14.57 | 21.06 | 44.70 | 5.26 | No |
| 22 | Dibutyl ketone | 90.0 | 1.88 | 2.62 | 5.42 | 27.8 | 1.67 | No |
| 23 | Dibutyl Carbitol | 80.0 | 4.25 | 7.90 | 17.50 | 103.9 | 0.15 | No |

It is evident that in all cases where the weight percent of the polyethylene particles in submicron sizes exceeded 45%, excellent latices which formed continuous films at atmospheric temperatures were obtained. Those dispersions having smaller proportions of particles in submicron sizes were non-film forming, showing that these organic liquids were not effective in accordance with the invention, even at the 50 parts per 100 concentration level.

Having regard to the foregoing disclosure, the following is claimed as the inventive and patentable embodiments thereof:

1. A process for preparing stable film-forming aqueous ethylene polymer latices containing particles of ethylene polymers of submicron size, which comprises homogeneously dispersing in water an ethylene polymer and an emulsifier consisting essentially of a water-soluble block copolymer of ethylene oxide and propylene oxide having a molecular weight above about 4,100 and containing at least about 50% by weight of ethylene oxide, in an amount within the range of from about 0.5 to about 25 parts of said emulsifier per 100 parts of polymer, in the presence of an amount within the range of from about 10 to about 100 parts per 100 parts of polymer of a volatile inert organic liquid that is soluble in the ethylene polymer and under a pressure sufficient to maintain the water and the organic liquid in the liquid phase.

2. A process in accordance with claim 1, in which the temperature is within the range from about 60° to about 250° C.

3. A process in accordance with claim 1, in which the pressure is superatmospheric.

4. A process in accordance with claim 1, in which the polymer is polyethylene homopolymer.

5. A process in accordance with claim 1, in which the polymer is a copolymer of ethylene and propylene.

6. A process in accordance with claim 1, in which the ethylene polymer is in an amount of at least 30 parts per 100 parts of water.

7. A process in accordance with claim 1, in which the organic liquid is an aromatic hydrocarbon.

8. A process in accordance with claim 1, in which the organic liquid is a ketone.

9. A process in accordance with claim 1, in which the organic liquid is an aliphatic hydrocarbon.

10. A process in accordance with claim 1, in which the organic liquid is a dialkyl ether.

11. A process in accordance with claim 1, in which the organic liquid is an alicyclic hydrocarbon.

12. A process in accordance with claim 1, in which the organic liquid is a naphthenic hydrocarbon.

13. A process in accordance with claim 1, in which the organic liquid is an aromatic ether.

References Cited

UNITED STATES PATENTS

| | | | |
|---|---|---|---|
| 2,921,920 | 1/1960 | Smith et al. | 260—29.6 |
| 2,947,715 | 8/1960 | Charlet et al. | 260—29.6 |
| 3,055,853 | 9/1962 | Pickell | 260—29.6 |

FOREIGN PATENTS

| | | |
|---|---|---|
| 242,750 | 1/1963 | Australia. |
| 672,120 | 10/1963 | Canada. |

MURRAY TILLMAN, *Primary Examiner.*

J. W. SNOW, *Assistant Examiner.*

U.S. Cl. X.R.

260—94.9